(12) United States Patent
Venkatachalapathy et al.

(10) Patent No.: US 12,028,253 B2
(45) Date of Patent: Jul. 2, 2024

(54) CONTROL PLANE DRIVEN SUMMARIZATION IN A NETWORK

(71) Applicant: Cisco Technology, Inc., San Jose, CA (US)

(72) Inventors: Balaji Pitta Venkatachalapathy, San Ramon, CA (US); Sanjay Kumar Hooda, Pleasanton, CA (US); Marc Portoles Comeras, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 67 days.

(21) Appl. No.: 17/558,247

(22) Filed: Dec. 21, 2021

(65) Prior Publication Data

US 2023/0198902 A1 Jun. 22, 2023

(51) Int. Cl.
*H04L 45/748* (2022.01)

(52) U.S. Cl.
CPC .................. *H04L 45/748* (2013.01)

(58) Field of Classification Search
CPC ....... H04L 45/04; H04L 45/122; H04L 45/22; H04L 45/245; H04L 45/28
See application file for complete search history.

(56) References Cited

U.S. PATENT DOCUMENTS

| | | | |
|---|---|---|---|
| 6,434,144 B1 * | 8/2002 | Romanov | H04L 45/54 370/395.32 |
| 9,049,148 B1 | 6/2015 | Singh | |
| 10,623,322 B1 * | 4/2020 | Nallamothu | H04L 45/745 |
| 2011/0194561 A1 | 8/2011 | Kompella | |
| 2012/0287935 A1 | 11/2012 | Swallow et al. | |
| 2016/0380823 A1 * | 12/2016 | Shen | H04L 45/80 370/254 |
| 2017/0142226 A1 | 5/2017 | De Foy et al. | |
| 2020/0259746 A1 * | 8/2020 | Thubert | H04L 45/28 |
| 2020/0267081 A1 | 8/2020 | Lim et al. | |
| 2022/0224629 A1 * | 7/2022 | Mada | H04L 45/28 |

OTHER PUBLICATIONS

Jia, Wen-Kang et al.: "Flow Aggregation for Large-Scale SDNs with Scattered Address Space Allocation", Journal of Network and Computer Applications, Academic Press, New York, NY, US, vol. 169, Aug. 15, 2020 (Aug. 15, 2020), XP086272504, ISSN: 1084-8045, DOI: 10.1016/J.JNCA.2020:102787 [retrieved on Aug. 15, 2020] the whole documen.

(Continued)

*Primary Examiner* — Mansour Oveissi
(74) *Attorney, Agent, or Firm* — Lee & Hayes, P.C.

(57) ABSTRACT

Techniques for dynamically adapting a router capacity to system needs in a network. The border router may receive a list of summarized prefixes for endpoint devices associated with the router from control-plane nodes. The router may store the list of summarized prefixes in memory of the border router. Once the router receives traffic that is destined for endpoint devices associated with the border router, it may determine that the destination address is included in the summarized prefixes. In some examples, the router may download complete prefixes from the control-plane nodes, and forward the traffic to the destination address indicated by the complete prefixes.

17 Claims, 6 Drawing Sheets

(56) References Cited

OTHER PUBLICATIONS

The PCT Search Report and Written Opinion mailed Mar. 27, 2023 for PCT application No. PCT/US2022/053375, 17 pages.
Rifai, M. et al: "Too Many SDN Rules? Compress Them with Minnie", 2015 IEEE Global Communications Conference ( GLOBECOM) , IEEE, Dec. 6, 2015 (Dec. 6, 2015) , pp. 1-7, XP032872824, DOI: 10.1109/GLOCOM.2014.7417661 [retrieved on Feb. 23, 2016] 1st-4th pages; abstract; figure 2.

* cited by examiner

CONTROL PLANE DRIVEN SUMMARIZATION IN A NETWORK

TECHNICAL FIELD

The present disclosure relates generally to techniques for intelligent network deployments. More specifically, it is directed to extending a mechanism for on-demand based network allowing the routers to dynamically adapt to the network needs.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IOT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Computing networks have continued to become more complex, such as with the introduction of software-defined networks (SDNs). In SDNs, the management of networks is centralized at a controller or orchestrator such that the control plane is abstracted from the data forwarding functions in the discrete networking devices. The SDN orchestrator is the core element of an SDN architecture and enables centralized management and control, automation, and policy enforcement across physical and virtual network environments. Various standards or protocols have been developed for SDN architectures, such as OpenFlow, Programming Protocol-independent Packet Processors (P4), open virtual switch database (OVSDB), Python, and so forth. These SDN protocols allows the SDN orchestrator to directly interact with the forwarding plane of network devices (such as switches and routers) using, for example, various application programming interfaces (APIs).

In an SDN, a plane is an abstract conception of where certain processes take place. The two most commonly referenced planes in networking are the control plane and the data plane (also known as the forwarding plane). The control plane is the part of a network that controls how data packets are forwarded—meaning how data is sent from one place to another. The process of creating a routing table, for example, is considered part of the control plane. Routers use various protocols to identify network paths, and they store these paths in routing tables. In contrast to the control plane, which determines how packets should be forwarded, the data plane forwards the packets. In conventional networking the control and data plane are implemented in the firmware of routers and switches. However, in the SDN data and control planes are decoupled, the control plane is removed from network hardware, and it is implemented in software instead, which enables programmatic access, and as a result makes network administration much more flexible.

In a mesh network deployment, a border router is a specific type of router that provides connectivity between two adjacent networks, and route the traffic from a first network to a second network. Traditionally, in campus deployments such as SDNs, border routers are assumed to be large boxes which are able to accommodate enough forwarding information to reach all endpoints in a network site. However, there are scenarios wherein the border router may not hold sufficient forwarding space to accommodate all the fabric endpoints. For examples, the user may select a smaller device that does not have enough space to store the complete list of prefixes to act as a border router, or the border router may provide service for a larger site including endpoints while the complete list of prefixes may exceed the capacity of forwarding table stored in the router.

Various challenges arise when deploying border routers in mesh networks such as SDNs network. For instance, when a packet forwarded to the border router associated to a prefix, which is included in the complete list of the prefixes published by a map server, but it is not stored locally in the border router, the router may not be able to route the packet to the destination address efficiently. In order to perform efficient routing, the border router may need to be configured to store the complete list of published prefixes in its memory or have access to the complete of list of prefixes as needed basis.

Thus, in order to improve the routing efficiency, there is a need for a mechanism to enable a border router with limited capacity to store or have access to the complete list of prefixes published by the map server. Such mechanism may improve the overall network performance and user experience by improving the router performance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 further illustrates network controller nodes and its service processing for routing a packet between or across networks.

DESCRIPTION OF EXAMPLE EMBODIMENTS

Overview

Figure 1:
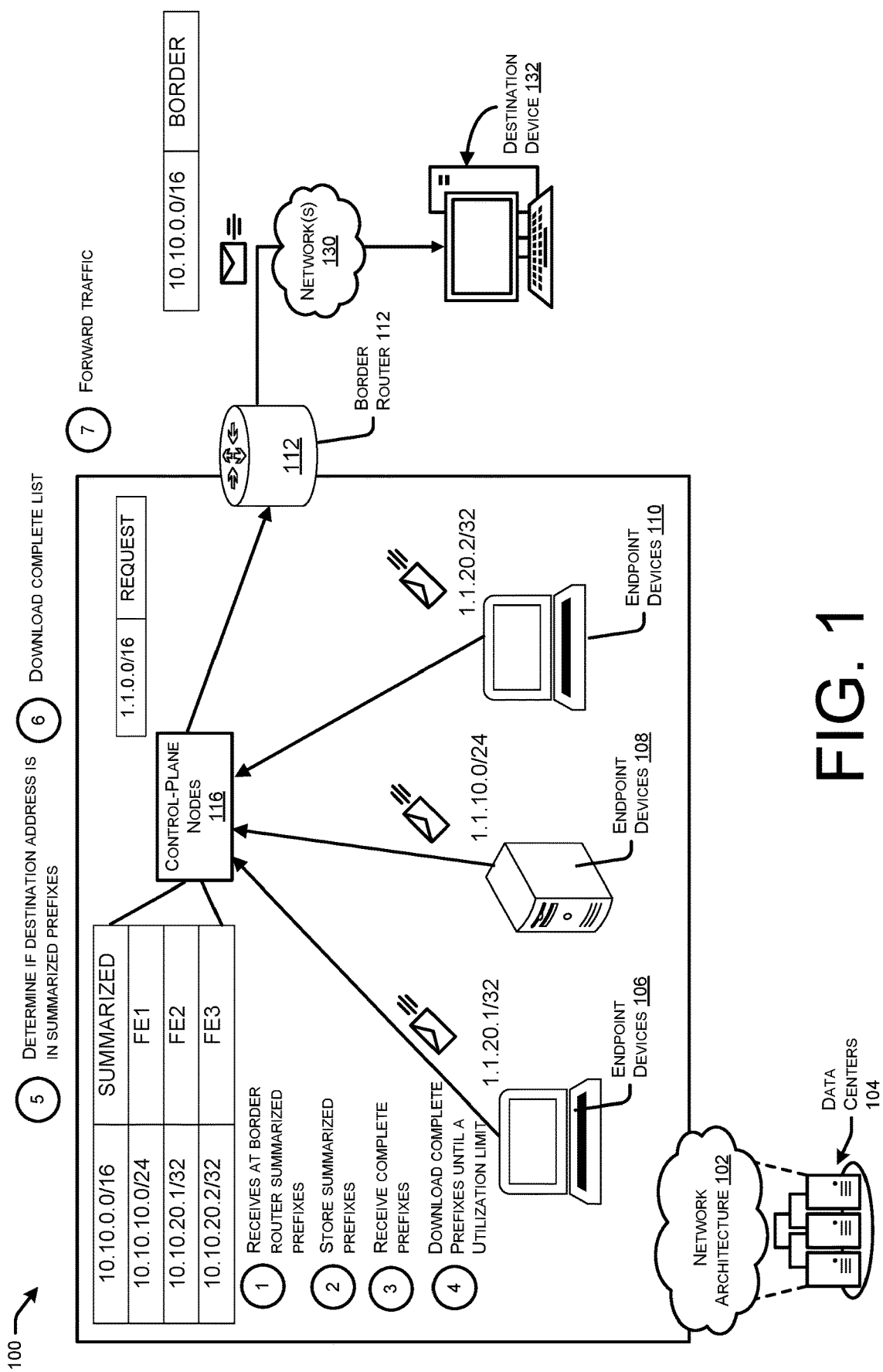
FIG. 1 illustrates a system diagram of network architecture for routing traffic in a network or between or across networks.

The present disclosure describes an approach that allows a border router in a network to dynamically use its forwarding capacity while still being able to offer border router service.

This disclosure further describes a method for a network resource management in a data network, the method may be performed using control-plane techniques (e.g., software defined radio (SDN) control-plane) by the border router. The method may include receiving, at the border router, summarized prefixes for endpoints associated with the border router. The border router may store the summarized prefixes in memory of the border router. Further, the method may include receiving, at the border router, traffic that is destined for an endpoint device associated with the border router. Moreover, the method may include determining, by the border router, whether the destination address is included in the summarized prefixes. If the destination address is not included in the summarized prefixes, the border router may download the complete prefixes from a control-plane device. Finally, the method may include forwarding the traffic, by the border router to the destination address indicated by a complete prefix.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques to improve routing efficiency in a data network. In network routing, the control plane is the part of the router architecture that is involved with outlining network topology, or the information in a routing table that defines how to route the incoming packets. In most cases, the routing table contains a list of destination addresses and prefixes associated with the addresses. Control plane mechanisms can identify the certain packet to be discarded, as well as processing certain packets with preferential treatment. By contrast, the data plane (forwarding plane) is the part of software that process the data requests. The control plane is able to enable or disable the data plane. In some examples, a separate forwarding information table that is populated by the control plane is used by the data plane to identify where to route the packet.

In some instances, the techniques may be utilized in a Software Defined Radio (SDR) data network. SDN allows dynamic configuration of the network by taking a new approach to the network architecture. In a traditional network device, like a router or switch it contains both the control and data plane the control plane determines the route traffic that traffic will take through the network, while the data plane is the part of the network that actually carries the traffic. By separating the control and data plane in an SDN, network equipment can be configured externally through vendor independent management software, and has the potential to transform the network from a close system to an open system. SDN may also hep to enable centralization of network management system for different entities within a data network.

In some examples, the techniques may be employed by a border router which is placed at the edge of first network and a second network. The border router provides connectivity of the nodes in first network to other nodes in the second network. When traffic arrives at the border router, the border router may designate the traffic to the other networks (e.g., the second network). The border router may designate the traffic to reach a certain destination based on routing information. The border may summarize networks found through an Open Shortest Path First (OPSF) routing protocol, and then stores copies of its link-state database in its memory when one entry may show an area where the borer router is connected.

In some examples, such as campus deployment SDN, the border routers used in the deployment, maybe large boxes which are able to accommodate enough forwarding information to reach all endpoints in a campus site. In these used cases, the border router may be required to have sufficient forwarding space to accommodate all the fabric endpoints. However, in some examples a network user may select a smaller device to act as a border router. In some other examples, the border router may be serving a larger site with many endpoints, which the endpoints and its associated prefixes may exceeds the forwarding capacity of the border router.

In some examples, the techniques described herein may be used to build a binary relation between the control plane and data plane. In this regard, the control plane may publish a summarized list of prefixes representing the overlay network and meant to attract external traffic to the network. In some examples, the control plane may publish a complete list of all prefixes registered with a map-server meant to support fact convergence to incoming traffic, and always on reachability between services and end hosts. The binary relation establishes a trade-off in the network where a network user may need to choose either a higher cost and more capable router that can provide all the services including fast convergence, or a lower cost and lower capable router at the expense of limited services, and slower convergence speed.

In some examples, the techniques described herein allows a border router to dynamically adapt its resources to the network needs. In some examples, the border router may store the summarized list of prefixes and complete list of prefixes on its memory. Further, the border router may install the summarized list of prefixes to its Routing Table, or Routing Information Base (RIB), and Forwarding Table, or Forwarding Information Base (FIB). However, the border router may install the complete list of prefixes to FIB until a pre-established FIB utilization limit. Once traffic destined to one of fabric endpoints reaches the border router, then border router searches the FIB to identify whether the traffic prefix is an entry in the FIB. If the border router finds a match between the traffic prefix and an entry in the FIB, it will forward the traffic not the destination. In some examples, when the traffic prefix matches an entry in the summarized list, it may trigger an on-demand signal, and find an entry in the control plane, and thus dynamically download it to its FIB.

Additionally, the techniques described herein may be used to enable border router to make dynamic decision on the prefixes distributed to external networks, and the policies used to attract external traffic to the campus network. In some examples, when the user chooses to use a low-end router, which has limited control plane memory, these techniques allows the border router to only consumes summarized routes, and use child prefixes received from control plane nodes to support publication based convergence for traffic flows from service to the campus end-hosts.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system diagram of an example architecture 100 for dynamic routing of traffic according to some aspects of the current disclosure. System architecture 100 includes a network architecture 102 that may include one or more data centers 104. FIG. 1 further illustrates network control nodes 116 in the network architecture 102 (e.g.,) in the network architecture 102 deploying traffic management and routing to the other networks in connected to the network 102 such as network 130.

In some examples, the network architecture 102 may include devices housed or located in one or more data centers 104. The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAS, servers, and/or any other type of device. Further, the network architecture 102 may include virtual resources, such as VMs, containers, and/or other virtual resources.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The destination device 132 may establish communication connections over one or more networks 130 to communicate with devices in the network architecture 102, such as control plane nodes 116 of the network architecture 102. The network(s) 130 may include any viable communication technology, such as wired and/or wireless modalities and/or technologies. Networks 130 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user administrator device 106 may communicate using any type of protocol over the network 130, such as the transmission control protocol/Internet protocol (TCP/IP) that is used to govern connects to and over the Internet.

The endpoints device 106, 108, and 110 may include any network capable hardware devices that can connect to the network architecture 102 using any type of communication protocol. For instance, the endpoint devices 106, 108, and 110 can refer to desktop computers, laptops, smartphone, tablets, printers or any other specialized hardware such as sensors, actuators, smart meters, etc. The network devices 106, 108, and 110 may include network interfaces to connect to the network architecture 102. In some examples the 106, 108, and 110 may include software to perform security protocol to enable them to communicate to the network architecture 102.

The control plane nodes 116 manages the network nodes such as endpoint devices 106, 108, and 110. Also, the control-plane nodes 116 may perform routing algorithms to select a path for a traffic from an endpoint device (e.g., 106, 108, 110) in the network architecture 102 to a destination device (e.g., destination device 132) in the network 130. In some examples, the control-plane nodes 116 may include a routing table that defines how to route the incoming packets. The routing table may contain a list of destination addresses, associated prefixes, and outgoing interfaces associated with them. In some example, the control-plane nodes 116 may transmit summarized list of prefixes and/or complete list of prefixes to the border router 112.

The border router 112 may sit in the edge of network architecture 102 and network 130, and provide connectivity of the nodes of network architecture 102 such as endpoint devices 106, 208, and 110 to the nodes of network 132 such as destination device 132. The border router 112 may receive a summarized list of prefixes or complete list of prefixes from the control-plane nodes 116. In some examples, the border router 112 may store the summarized list of prefixes on its memory. In some other examples, the border router 112 may store the complete list of prefixes on its memory. When traffic arrives to the border router 112, the border router may look up the summarized list of prefixes or the complete list of prefixes to find traffic prefix, and forward the traffic to the destination device such as destination device 132 in the network 130.

At "1", the order router receives the list of summarized prefixes. Each IP address is associated to a prefix. The summarizes list of the prefixes may include a subset of complete list of prefixes. For instance, the summarized list of prefixes may be related to those destination devices which may have higher service requests from the network than the other nodes.

At "2', the border router stores the list of summarized prefixes on its memory. This allows the border router to reduce its memory size while serving a large site in which the number of endpoint devices can exceed the number of prefixes in the Routing Information Table (RIB) or Forward Information Table (FIB). In some example, the border router may install the summarized list of refixes to its FIB or RIB.

At "3" the border router receives the complete list of prefixes. The complete list of prefixes may include IP addresses of the all network devices At "4", the border router installs the list of complete prefixes to its FIB until a pre-established utilization limit reached. The available memory space of the border router may determine the pre-established utilization limit. The part of the list of complete prefixes which are not stored on the border router memory, may be hold in the control plane memory.

At "5", when traffic arrives at the border router, the border router may look up the traffic prefix in its FIB to determine if it matches an entry. If it matches, the border router may forward the traffic.

At "6", when the traffic arrives at the border router and the traffic prefix does not match an entry in the summarized list of prefixes, it may trigger an on-demand signal, and may find an entry in the control plane nodes routing table. Then, the border router may download the list of completer prefixes to its FIB dynamically. When the traffic triggers a download from control-plane memory to the FIB, the border may apply the usual eviction policies to keep FIB utilization within certain boundaries.

At "7", the border router forwards the traffic to the destination device based on the prefix it found in the summarized prefixes stored on its memory or downloaded from the complete list of prefixes.

It is worth to mention that in the techniques described in the steps 1-5 above, the control-plane may either publish the summarized list of prefixes representing the overlay network to attract external traffic, or publish the entire list of prefixes registered with a map-server to support fast convergence to incoming traffic, and provide all time reachability between services and an end-hosts. As a result, these techniques allow the border router to adapt dynamically to the network traffic based on the availability of the resources.

It is appreciated that the border router may not need to issue a map-request to the map-server, and wait for a map-reply to download the list of complete prefixes from the control-plane memory. Further, a Locator/ID Separation Protocol (LISP) map-cache eviction logic may be applied for the entries downloaded from the control-plane memory. In some scenarios, where broader router is not a large box, and thus it does not have enough space to store all fabric endpoint devices, the techniques described herein may be useful since there may not be any needs for the control-plane to send map-request/map-reply messages to the border router.

In some scenarios, during a host roam event, the boarder router may not need to rely on LISP solicit map reply for convergence. Hence, when the map-server announces publication for an Endpoint Identifier (EID) that has roamed, it may check whether it has downloaded in the FIB table, and may update the entry. In some examples, when the traffic reaches the border router is destined to a nonexistent end-point device, the border router may compute and download a negative/drop prefix using local information in its control-plane memory without having to send a request to the centralized control-plane nodes.

Further, the techniques described herein, may enable the border router to dynamically make decision on the prefixes distributed to the external network (e.g., network 130) based on the traffic information, and dynamically create policies to attract external traffic to the campus network (e.g., network architecture 102). In some scenarios, when the user may choose to use a low-end router as the border router, which may also constrained in control-plane memory, the techniques provide herein allows the border router to utilize summarized routes and child prefixes publications to support publications based convergence for traffic flows from services to the campus network (e.g., network architecture 102).

In some examples, the process described above may be implemented by hardware and software agnostic model, where reliance on hardware or a specific platform is not required. A hardware-agnostic system may not require any modifications to run on a variety of network devices. Thus, hardware agnostic design brings about a high level of compatibility across most common network devices which is suitable for a brownfield environment.

In some examples, the process described above may be implemented by feature agnostic data models, where the data transmission format is irrelevant to the network devices transmit or receive IP packets. For instance, the router configurations are unaware of network topologies connecting the network devices to the networks 102, 130. The network topologies may include Virtual Extensible Local Area Network (VXLAN), Ethernet Virtual Private Network (EVPN), Border Gateway Protocol (BGP), Massively Scalable Data Center (MSDC), Segment Routing (SR), etc. In feature agnostic approach, the data modeling algorithm for configuring controller intent may include larger intent engine to be consistent with the topology awareness and feature awareness.

Figure 2:
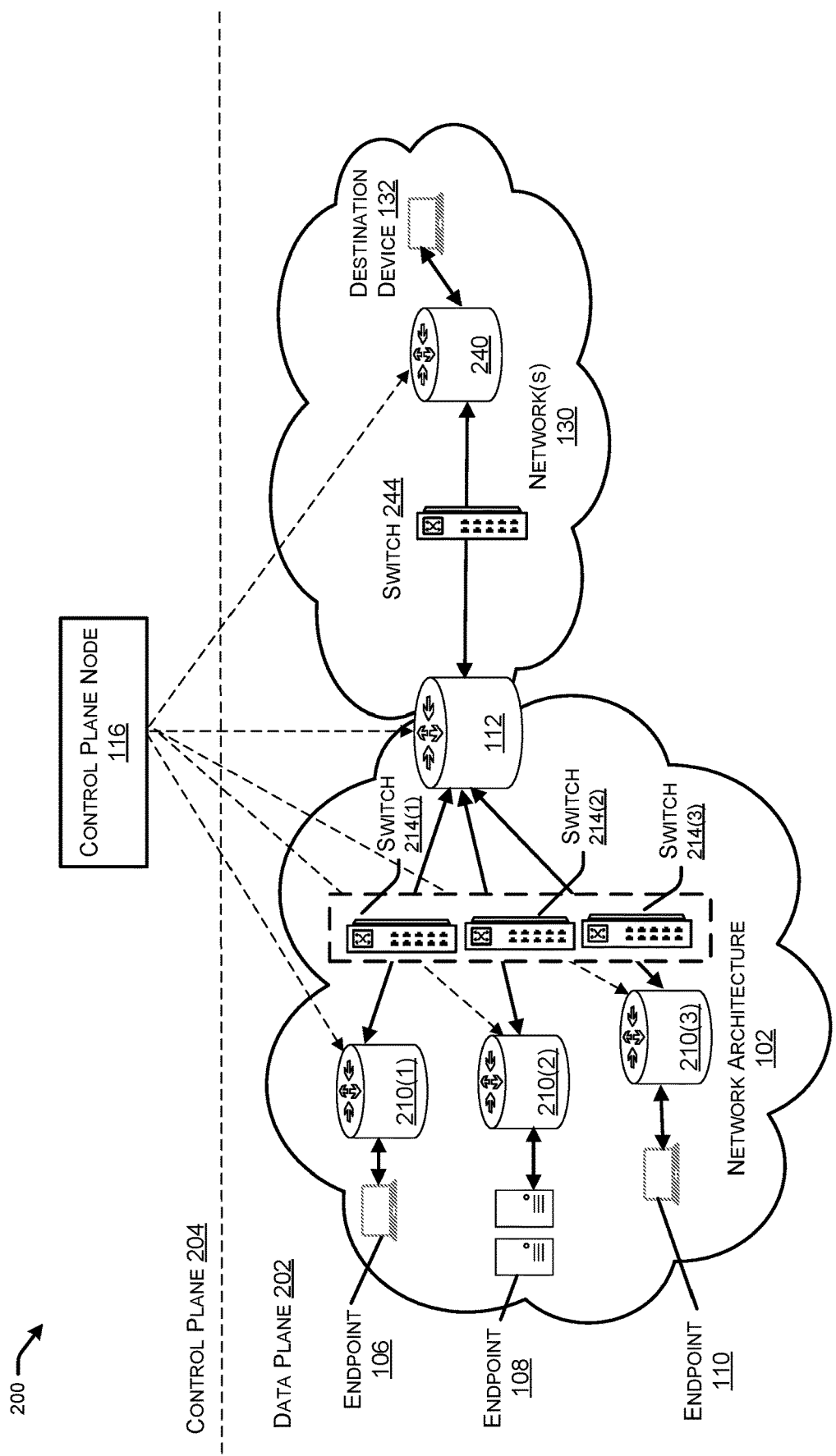
FIG. 2 illustrates a system diagram of an example network architecture illustrating how a border router forwards a packet between or across networks.

FIG. 2 is a system diagram of an example network architecture 200 illustrating how a border router forwards a packet between or across networks. As illustrated, network architecture 200 includes network architecture 102 and network 130, which are connected to the control plane nodes 116. The control plane nodes are in the control plane 204, and the network architecture 102 and network 130 are located in the data plane 202. The network architecture 102 includes switches 214(1)-214(3), routers 210(1)-210(3), endpoint devices 106, 108, 110, and border router 112. The network 130 includes switch 244, router 240, and destination device 132. The border router 112 may sit in the edge of the network architecture 102, and the network 130, and may perform routing and forwarding packets and traffic across the networks.

The control plane 204 may control how data packets are forwarded from-meaning how data is sent from one network to the other network (e.g., network architecture 102 to network 120, or vice versa). For example, the process of creating a routing tables FIB and RIB is considered part of the control plane. Routers 210(1)-210(3), 240, 112, may use various protocols to identify network paths, and they store these paths in routing tables FIB and RIB. The control plane nodes 116, may manage routing protocols across the networks 102, 130, and configuring 210(1)-210(3), 240, 112. In addition, the control plane 116, may store a complete list of prefixes on its memory, and publish it the border router 112.

The switches 214(1)-214(3) may be included in a fabric switch, and may interconnect endpoint nodes (e.g., 106, 108, 110) in the network architecture 102 via the local routers 210(1)-210(3) to the border router 112. The switches 214(1)-214(3) may be implemented in hardware and software, and may move IP packet from the network architecture 102 to the network 130 or vice versa. The switch 244 may be included in a fabric switch, and may interconnect border router 112 to the destination device 132 via the local router 240. The switch 244 may be implemented in hardware and software, and may move IP packet from the network architecture 102 to the network 130 or vice versa. Switches 210(1)-210(3) and 240 manage the flow of data across the networks 102, and 130 by transmitting a received network packet only to the one or more endpoint or destination devices for which the packet is intended. Each networked device such as endpoint devices or destination devices connected to a switch may be identified by its network address, allowing the switch to direct the flow of traffic maximizing the security and efficiency of the network.

As noted above, the switches 214(1)-214(3), and 244 may be connected to the local routers 210(1)-3(3), and 240 respectively. The local routers 210(1)-210(3), may be connected to several endpoint devices and/or destination devices and may forward or route the IP packets to the border router 112. For instance, the local routers may send traffic through the network architecture 102 on behalf of, endpoint devices such as general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoint devices (e.g., 201(1)-210(3) can also include Internet of Things (IOT) devices or equipment, such as agricultural equipment, connected cars and other vehicles, smart home sensors and devices (e.g., alarm systems, security cameras, lighting, appliances, media players, HVAC equipment, utility meters, windows, automatic doors, door bells, locks, etc.), healthcare devices (e.g., pacemakers, biometric sensors, medical equipment, etc.), industrial equipment (e.g., robots, factory machinery, construction equipment, industrial sensors, etc.), retail equipment (e.g., vending machines, point of sale (POS) devices, Radio Frequency Identification (RFID) tags, etc.), smart city devices (e.g., street lamps, parking meters, waste management sensors, etc.), and so forth.

The multi-plane networks 102 and 130 are illustrated as a simple network architecture with switches and routers, but this is merely for illustrative purposes. The network 102, 130 may include different numbers and/or types of endpoints, nodes, cloud components, servers, software components, devices, virtual or physical resources, configurations, topologies, services, appliances, or deployments are also contemplated herein. Further, the networks 102,130 can include any number or type of resources, which can be accessed and utilized by endpoint devices or network devices. The illustrations and examples provided herein are for clarity and simplicity.

Figure 3:
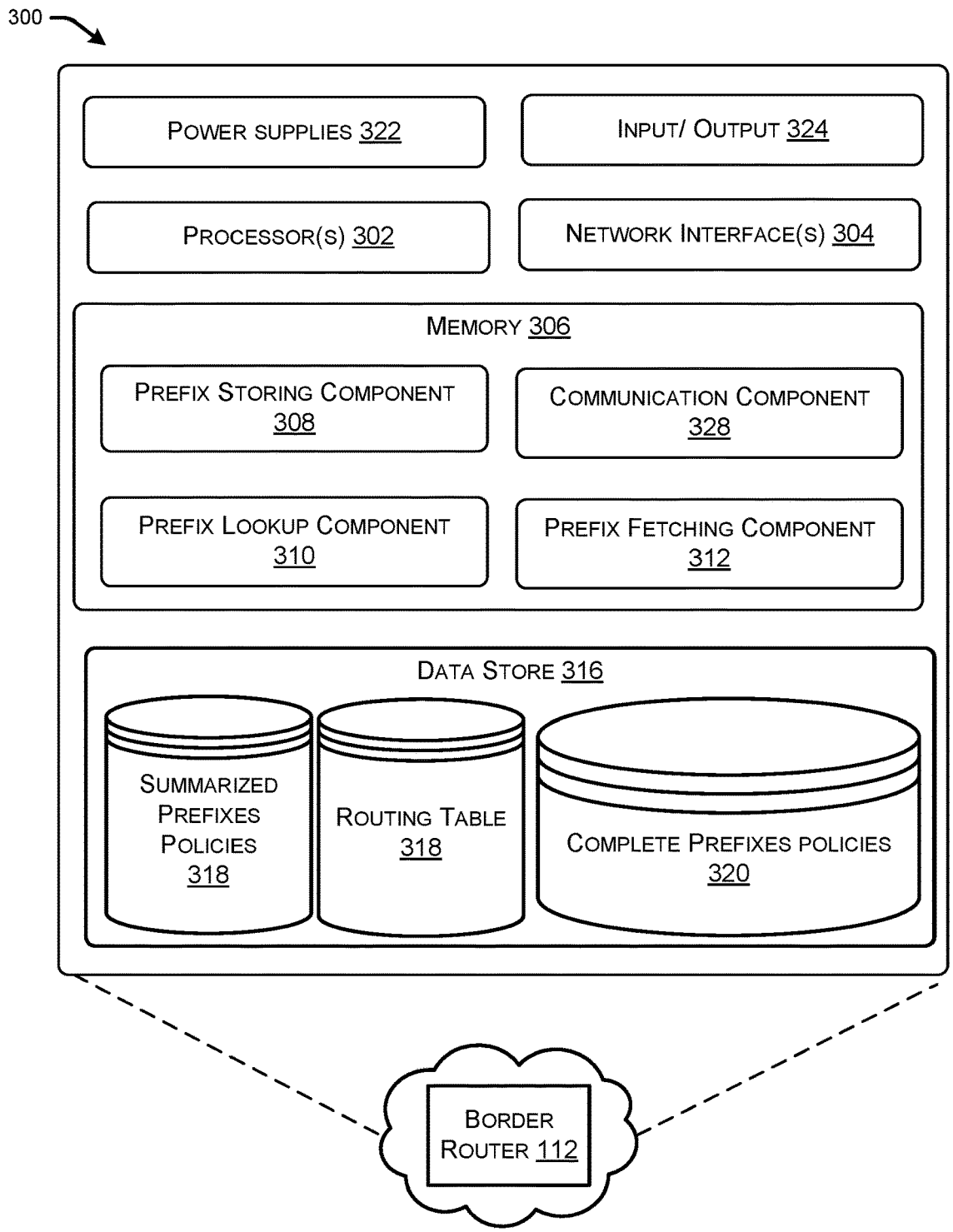
FIG. 3 illustrates a component diagram of an example border router that can be utilized to implement aspects of the technologies disclosed herein.

FIG. 3 illustrates a component diagram of an example an example border router 116 that can be utilized to implement aspects the technologies disclosed herein. The border router 116 may be any type of computing device capable of receiving traffic from endpoint devices in the network architecture 102, and sending the traffic to destination devices in the network 130 via suitable data communications network devices such as, but not limited to, a laptop or desktop computer, a tablet computing device, a server computer, a television, or a mobile telephone.

As illustrated, the border router 116 may include one or more hardware processors 302 (processors), one or more devices, configured to execute one or more stored instructions. The processor(s) 302 may comprise one or more cores. Further, the border router 116 may include one or more network interfaces 304 configured to provide communications between the border router and/or other systems or devices in the network architecture 102, network 130 and/or remote from the networks 102, 130. The network interfaces 304 may include devices configured to couple to personal area networks (PANs), wired and wireless local area networks (LANs), wired and wireless wide area networks (WANs), and so forth. For example, the network interfaces 304 may include devices compatible with Ethernet, Wi-Fi, and so forth.

The border router 116 can include one or more power supplies 322, such as one or more batteries, connections to mains power, etc. The border router 116 can also include one or more inputs and outputs 324 for receiving and processing input from a number of input devices, such as a keyboard, a mouse, a touchpad, a touch screen, an electronic stylus, or other type of input device. Further, the input/outputs 324 can include a display, such as a computer monitor, a flat-panel display, a digital projector, a printer, or other type of output device. It will be appreciated that the user border router 116 might not include all of the components shown in FIG. 3, can include other components that are not explicitly shown in FIG. 3, or might utilize an architecture completely different than that shown in FIG. 3.

The border router 112 may also include memory 306, such as computer-readable media, that stores various executable components (e.g., software-based components, firmware-based components, etc.). The memory 306 may generally store components to implement functionality described herein. The memory 306 may store an operating system 318 utilized to control the operation of components of the controller 116. Further, the memory 306 may store a communication component 328 that comprises software (e.g., any protocol stack) to enable the border router 112 to communicate with other devices using the network interface 304.

In some examples, the memory 306 may include a prefix storing component 308 configured to enable border router 112 to store the list of prefixes (summarized or complete) received from control-plane nodes in the data store 316. The prefix look-up component 310 may look up the received traffic prefix in the data store 316 to find a match in the stored list of prefixes. The prefix fetching component 312 may fetch he matched prefix of the received traffic from the stored list of prefixes stored in the data store 316. The list of prefixes may be generally used with a route map to control the traffic on the basis of several parameters such ports, destination and source addresses. Additionally, the list of prefixes may be directly obtained from the IP address. The store, fetch and lookup components may comprise a human readable code or binary machine code, when executed on the processor 302, may enable the border router 112 to access data store 316, and obtain the list of prefixes via the network interface 304.

In some examples, the memory 306 may store a prefix storing component 308 configured to enable the router 112 to store the list of summarized prefixes at the data store 116. Also, the storing component 308 may store the complete list of prefixes until a pre-established FIB utilization limit on the datastore 316. The storing component 308 comprises a human readable code or binary machine code, when executed on the processor 302, may enable the router 112 to store the summarized or complete list of prefixes on the data store.

In some examples, the memory 306 may store a prefix lookup component 310 configured to look up the data store 308 to determine if there is a match between the prefix of the incoming traffic and an entry in the list of prefixes (summarized or complete) stored in the data store 316. The storing component may comprise a human readable code or binary machine code, when executed on the processor 302, may enable the router 112 to search data store 316 to find the prefix that may match the incoming traffic.

In some example, the memory 306 may store a prefix fetching component 312 configured to fetch the complete list of prefixes from control plane node. The prefix fetching component may comprise a human readable code or binary machine code, when executed on the processor 302, may enable the router 112 to fetch and/or install the complete list of prefixes from the control-plane nodes. The prefix fetching component 312 may not find an entry in the list of prefixes stored in the data store, it may access the control-plane memory to fetch the complete list of prefixes.

The border router 112 may further include a data store 316, which may comprise any type of computer memory including long-term memory (e.g., Read Only Memory (ROM), Random Access Memory (RAM), caches, etc.). The data store 316 may include a summarized list of prefixes policies 318 that includes a set of rules underlying summarized list of prefixes published by control-plane 116 such as port, addresses, prefixes, settings on hardware, protocols and network services, initially configured at the router. Further, the data store 316 may include a routing table 318, that includes FIB and RIB tables, and information is required by the router 112 to forward the packet to the proper interface. In addition, the data store 316 may include a complete list of prefixes policies 320 that includes a set of underlying complete list of prefixes published by control-plane nodes 116 such as port, addresses, prefixes, settings on hardware, protocols and network services, initially configured at the router.

Figure 4:
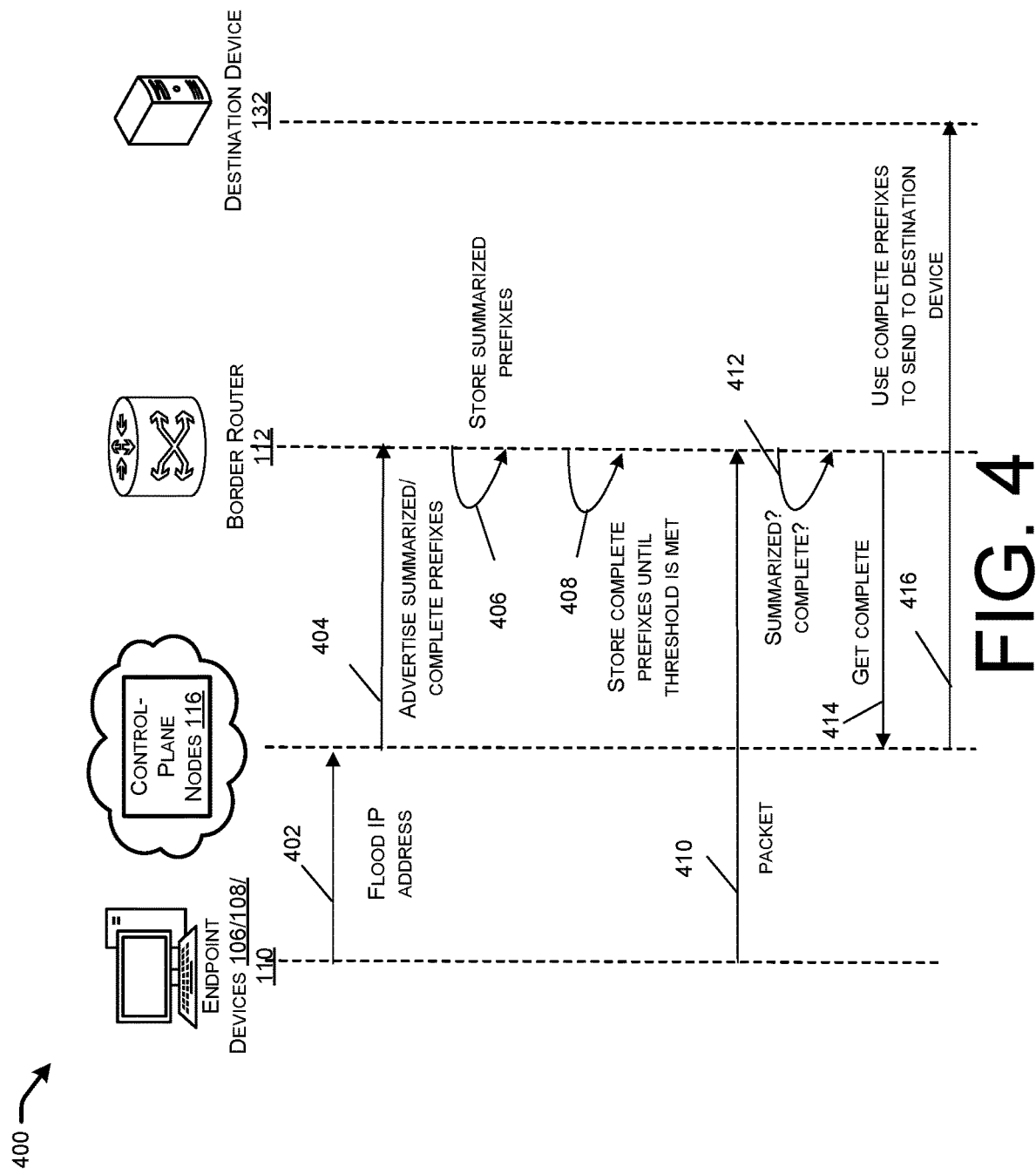
FIG. 4 illustrates a flow diagram of an example method for routing a packet between end devices and a destination device.

FIG. 4 illustrates a flow diagram of an example method 400 for routing a packet between end devices and a destination device according to some aspects of the current disclosure. Additionally, FIG. 4 illustrate communication flow between the network devices according to some aspect of described herein.

At step 402, endpoint devices 106, 108, 110 send their IP addresses to the control-plane nodes 116. The control plane nodes 116 may store their IP address and associated prefixes on its memory.

At step 404, the control-plane nodes 116 may publish the summarized and complete list of prefixes to the border router 112.

At step 406, the border router 112 may store the summarized list of prefixes on its memory. The border router may install the summarized list of prefixes to its FIB and RIB.

At step 408, the border router 112 may store the complete list of prefixes on its memory until a pre-defined threshold is met. The border router may install the summarized list of prefixes to its FIB.

At step 410, the border router 112, receives a packet from an endpoint device.

At step 412, the border router 112, extracts the packet prefix from the packet, and look up the store list of prefixes to determine if any entries may match the prefix of the packet. If any entries in the stored list matches the prefix of the packet, the border router forward the packet to the destination device 132.

At step 414, if any entries in the store list does not match the prefix of the packet, the border router may access the control-plane to receive the complete list of prefixes.

At step 416, the border router forwards the packet to the destination device 132, using the routing information associated with the packet prefix.

Figure 5:
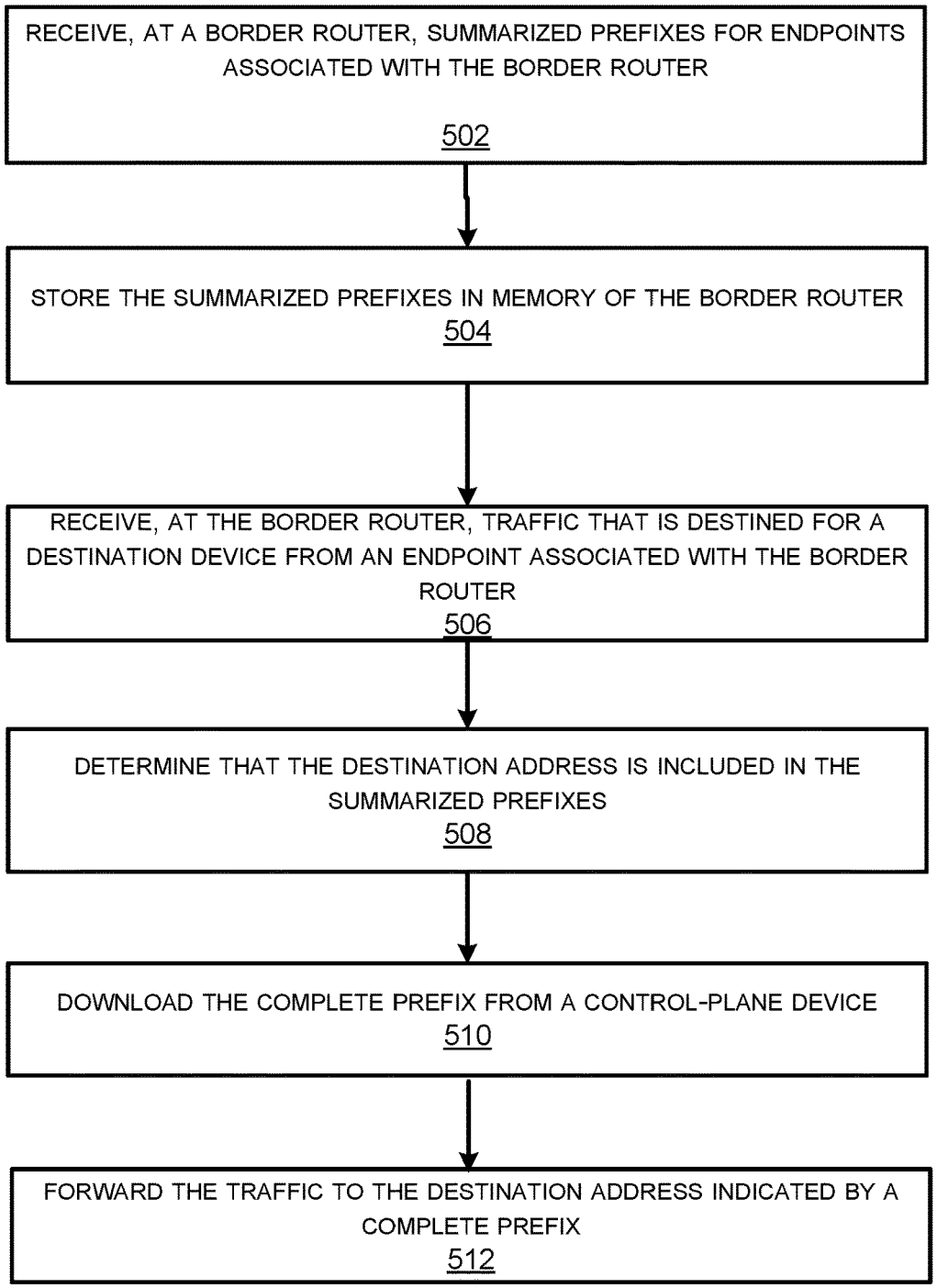
FIG. 5 illustrates a flow diagram of an example method for a boarder router component to route a packet from an end device to a destination device.

FIG. 5 illustrates flow diagram of an example method for a boarder router to route a packet from an end device to a destination device according to some aspects of the present disclosure.

At step 502, a border router receives summarized list of prefixes for endpoint devices associated with the border router. The summarized list of prefixes is a subset of a complete list of prefixes, which is stored in a control-plane memory.

At step 504, the border router stores the list of summarized prefixes on its memory. The border router may store the summarized list of prefixes to its FIB and RIB. In some example, the border router may also store the complete list of prefixes until a pre-defined threshold is met.

At step 506, the border router receives traffic that is destined for a destination device from an endpoint device associated with the border router. The border router may extract the prefix from the address field of the packet carrying the traffic.

At step 508, the border determines if the received packet prefix is included in the stored list of summarized prefixes. If the received packet cyclic prefix is included in the summarized list of prefixes, the border may identify the routing information from the FIB, RIB and routing table, and determine the interface the packet need to connect to. If the packet prefix is not included in the summarized list of prefixes, the method proceeds to the step 510.

At step 510, the border router downloads the complete list of prefixes from the control-plane memory. In some examples, the border router may trigger an on-demand signal to signal the control-plane nodes, and dynamically download the entries to its FIB.

At step 512, the boarder router forwards the traffic to destination device based on routing information associated to the packet prefix stored in the FIB and RIB.

Figure 6:
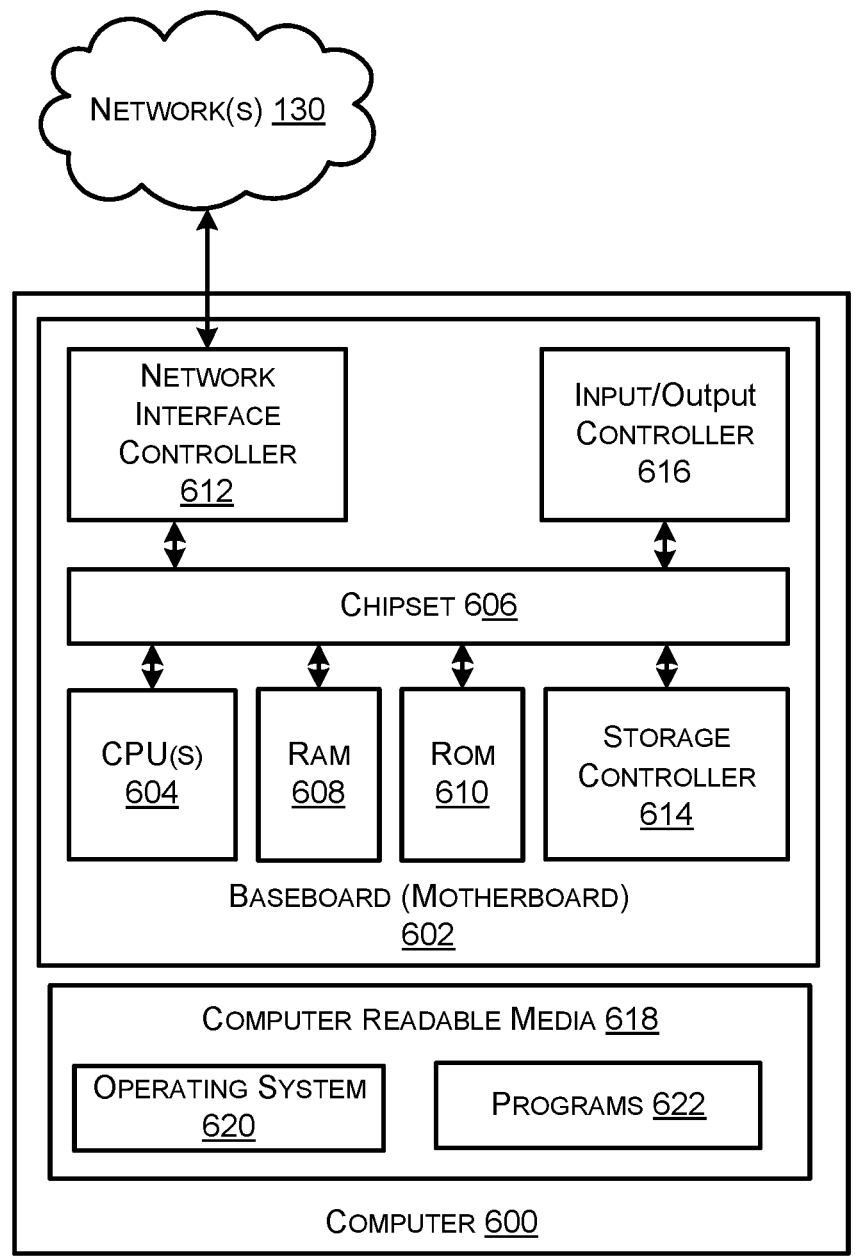
FIG. 6 is a computer architecture diagram showing an illustrative computer hardware architecture for implementing a computing device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer 600 may, in some examples, correspond to a border router 112, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 1304 and the remainder of the components and devices on the baseboard 602. The chipset 606 can provide an interface to a RAM 1308, used as the main memory in the computer 1300. The chipset 1306 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the networks 102, 130. The chipset 606 can include functionality for providing network connectivity through a NIC 612, such as a gigabit Ethernet adapter. The NIC 612 is capable of connecting the computer 600 to other computing devices over the network 130. It should be appreciated that multiple NICs 612 can be present in the computer 600, connecting the computer to other types of networks and remote computer systems.

The computer 600 can be connected to a storage device 1618 that provides non-volatile storage for the computer. The storage device 1318 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1318 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the administrator device 106, network controller 116, and or any components included therein, may be supported by one or more devices similar to computer 600. Stated otherwise, some or all of the operations performed by the border router 112, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 1300.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 1304 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIGS. 1-3, can include other components that are not explicitly shown in FIG. 6, or might utilize an architecture completely different than that shown in FIG. 6.

As described herein, the computer 600 may comprise on e or more of broader router 112, and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by border router 112. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for configuring switched fabric using a CLI and/or deploying switched fabric in brownfield network environment.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of network resource management, the method comprising:
 receiving, at a border router and from a control-plane device that manages a network fabric associated with the border router, summarized prefixes for endpoints associated with the network fabric connected to the border router, each of the summarized prefixes representing aggregations of complete prefixes that correspond to routes to different ones of the endpoints;
 storing the summarized prefixes in memory of the border router;
 receiving, at the border router, traffic that is destined for an endpoint of the endpoints associated with the network fabric;
 determining that a destination address of the traffic falls within an aggregation of the complete prefixes represented by at least one of the summarized prefixes;
 in response to determining that the destination address falls within an aggregation represented by at least one of the summarized prefixes, downloading, from the control-plane device, a complete prefix that represents a route to an endpoint associated with the destination address;
 storing the complete prefix as an entry in a forwarding information base (FIB) associated with the border router; and
 forwarding, using the entry for the complete prefix in the FIB, the traffic to the destination address indicated by the complete prefix.

2. The method of claim 1, further comprising:
 receiving complete prefixes;
 determining a number of the complete prefixes that, if be stored in the memory, results in less than a threshold amount of the memory being utilized; and
 storing the number of the complete prefixes.

3. The method of claim 2, further comprising:
 receiving additional traffic;
 determining that a second destination address for the additional traffic is in complete prefixes; and
 forwarding the additional traffic to the second destination address.

4. The method of claim 3, wherein the border router forwards the additional traffic to the second destination address in response to determining that the second destination address for the additional traffic is in the complete prefixes.

5. The method of claim 2, wherein the border router updates the number of complete prefixes dynamically based on its available memory.

6. The method of claim 1, wherein the border router forwards the traffic to the destination address indicated by the complete prefix in response to determining that the destination address is included in the summarized prefixes.

7. The method of claim 1, further comprising:
 dynamically determining policies to attract external traffic based on the received summarized prefixes.

8. The method of claim 1, wherein the border router receives a complete list of prefixes from the control-plane device.

9. The method of claim 1, further comprising:
 receiving additional traffic at the border router;
 determining that additional traffic is destined to a nonexistent endpoint; and
 dropping a second complete prefix from the memory of the border router.

10. The method of claim 1, wherein in response to downloading from the complete prefix, the border router applies policies on how to forward the traffic to the destination address.

11. A system comprising:
 one or more processors; and
 one or more non-transitory computer-readable media storing computer-executable instructions that, when executed by the one or more processors, cause the one or more processors to perform operations comprising:
 receiving, at a border router and from a control-plane device that manages a network fabric associated with the border router, summarized prefixes for endpoints associated with the network fabric connected to the border router, each of the summarized prefixes representing aggregations of complete prefixes that correspond to routes to different ones of the endpoints;
storing the summarized prefixes in memory of the border router;
receiving, at the border router, traffic that is destined for an endpoint of the endpoints associated with the network fabric;
determining that a destination address of the traffic falls within an aggregation of the complete prefixes represented by at least one of the summarized prefixes;
in response to determining that the destination address falls within an aggregation represented by at least one of the summarized prefixes, downloading, from the control-plane device, a complete prefix that represents a route to an endpoint associated with the destination address;
storing the complete prefix as an entry in a forwarding information base (FIB) associated with the border router; and
forwarding, using the entry for the complete prefix in the FIB, the traffic to the destination address indicated by the complete prefix.

12. The system of claim 11, the operations further comprising:
receiving complete prefixes;
determining a number of the complete prefixes that, if be stored in the memory, results in less than a threshold amount of the memory being utilized; and
storing the number of the complete prefixes.

13. The system of claim 12, the operations further comprising:
receiving additional traffic;
determining that a second destination address for the additional traffic is in complete prefixes; and
forwarding the additional traffic to the second destination address.

14. The system of claim 12, wherein the border router forwards the traffic to the destination address indicated by the complete prefix in response to determining that the destination address is included in the summarized prefixes.

15. The system of claim 12, wherein the border router updates the number of complete prefixes dynamically based on its available memory.

16. The system of claim 11, the operations further comprising:
dynamically determining policies to attract external traffic based on the received summarized prefixes.

17. At least one non-transitory computer-readable storage medium having stored therein instructions which, when executed by one or more processors, cause the one or more processors to:
receiving, at a border router and from a control-plane device that manages a network fabric associated with the border router, summarized prefixes for endpoints associated with the network fabric connected to the border router, each of the summarized prefixes representing aggregations of complete prefixes that correspond to routes to different ones of the endpoints;
storing the summarized prefixes in memory of the border router;
receiving, at the border router, traffic that is destined for an endpoint of the endpoints associated with the network fabric;
determining that a destination address of the traffic falls within an aggregation of the complete prefixes represented by at least one of the summarized prefixes;
in response to determining that the destination address falls within an aggregation represented by at least one of the summarized prefixes, downloading, from the control-plane device, a complete prefix that represents a route to an endpoint associated with the destination address;
storing the complete prefix as an entry in a forwarding information base (FIB) associated with the border router; and
forwarding, using the entry for the complete prefix in the FIB, the traffic to the destination address indicated by the complete prefix.

* * * * *